Inventor
M. G. DENTON.
By Thomas W. J. Clark
Attorney

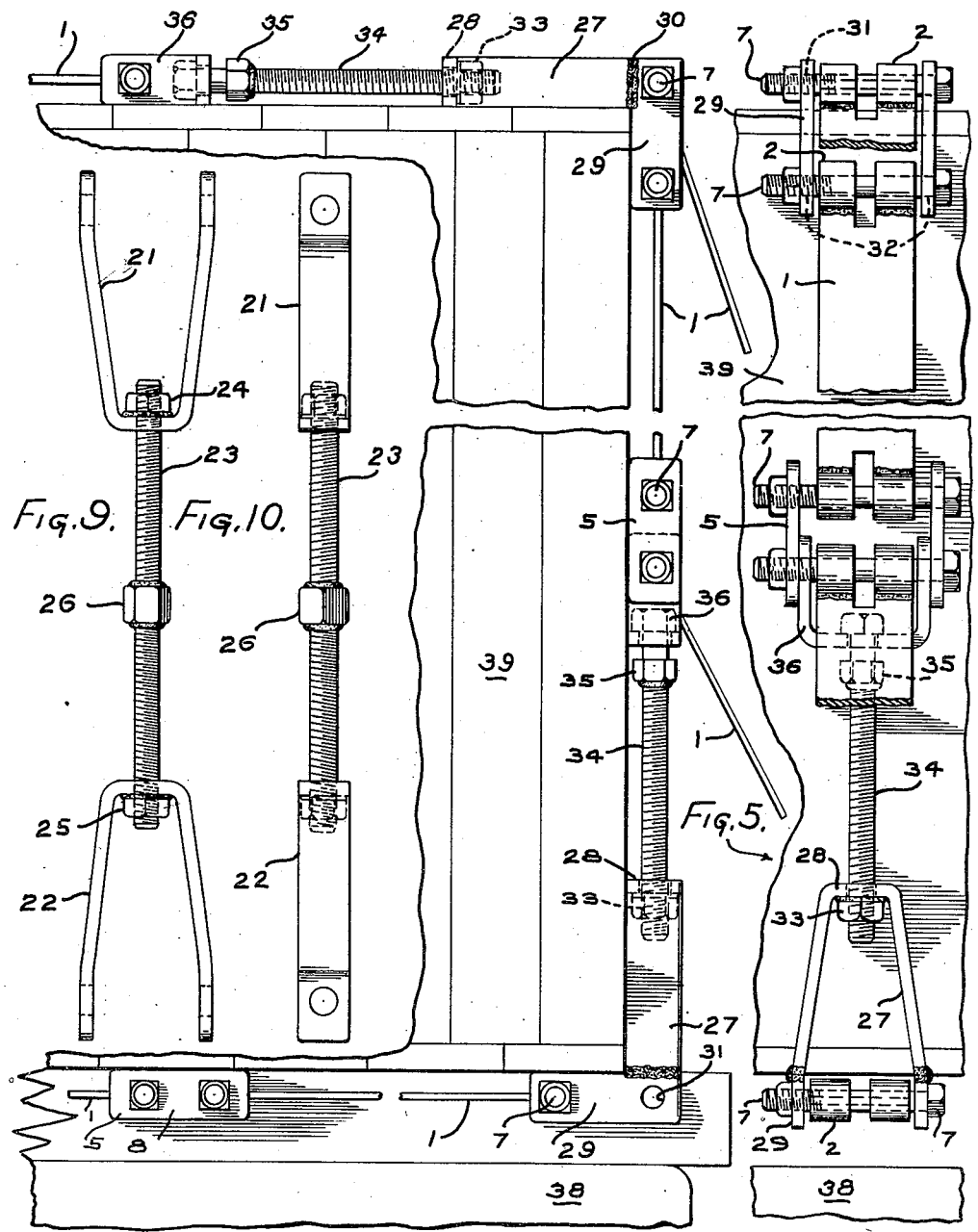

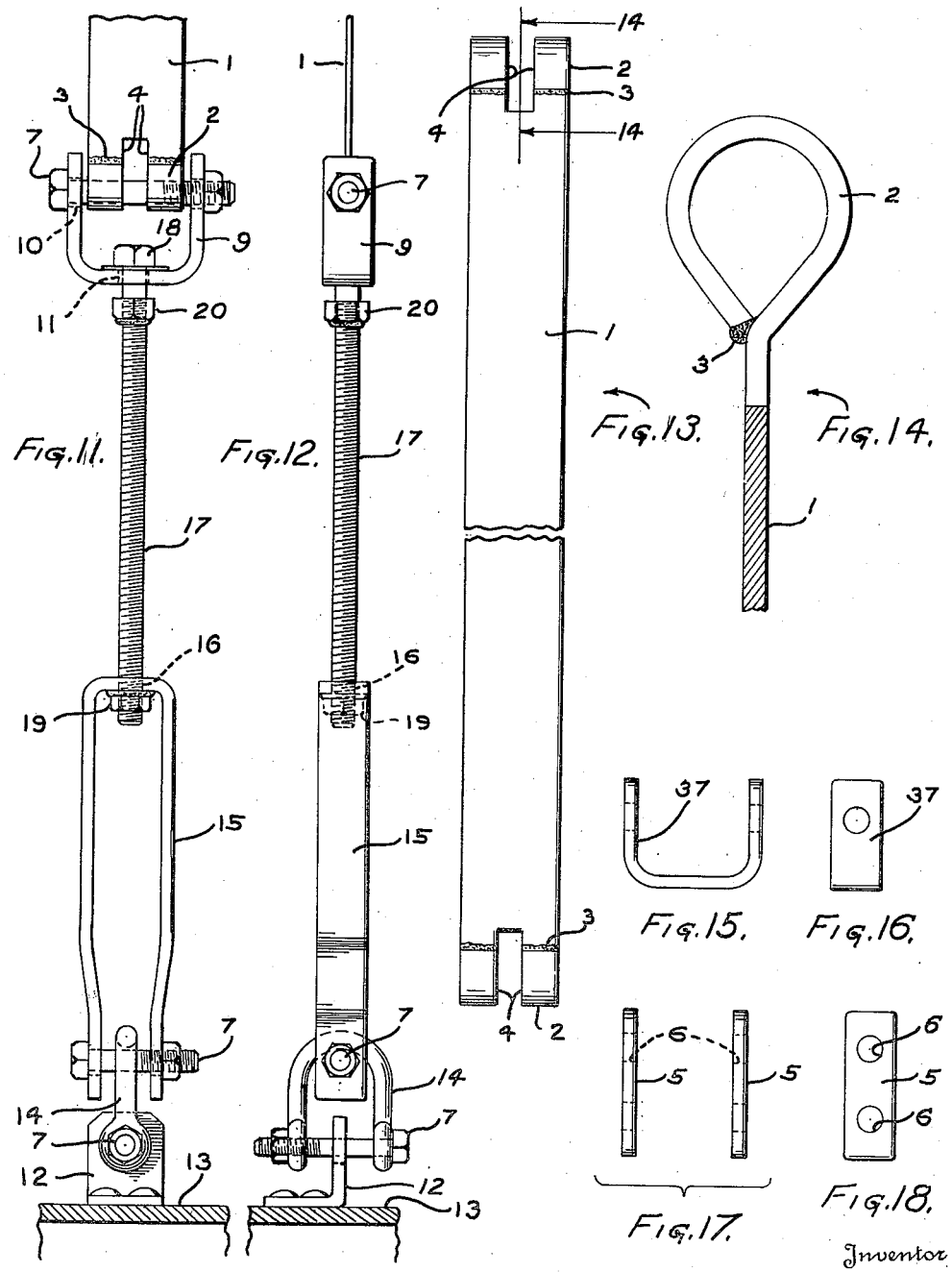

Patented July 4, 1944

2,353,017

UNITED STATES PATENT OFFICE 2,353,017

CARGO DECK LASHING

Malcolm G. Denton, Arbutus, Md.

Application January 28, 1944, Serial No. 520,126

2 Claims. (Cl. 248—361)

This invention relates to a cargo lashing apparatus and method.

During the present war it has been necessary to load the decks of vessels leaving this country with many large packing cases and crates, engines and other items intended for export and which were either too large to go in the hold of the vessel or which had to be placed on the deck because the vessel hold was already loaded. Many of these articles have been placed directly upon the hatch. Various types of rope and chain have been tried for lashing these cargoes in place but none of them have been found successful for although with much labor the cargo could be lashed at the beginning of the voyage, when heavy seas were shipped and when they beat upon the cargo it would work loose and oftentimes be a real menace to the safety of the ship.

The lashing apparatus of the present invention is sufficiently rigid to substantially avoid any stretching under strain, which permits the cargo to shift, and it is equipped with tensioning devices which permit its constant tightening if need be, due to loosening of the hold that the lashing apparatus might have, due to rolling of the vessel or the shipping of high seas. Several ships have had cargo lashed to their decks under proper governmental and underwriting supervision with the apparatus of this invention and they have made the crossing without loss to either cargo or ship even though locomotives weighing nearly one hundred tons were sometimes involved, and huge crates of materials have also been successfully lashed in place.

Other objects and advantages of the invention will be apparent from the following description and the accompanying drawings forming a part hereof in which:

Figure 4 is a partial end view, in detail, of the lashing at the corners of the cases of Figure 1.

Figure 5 is a front view of the detail of Figure 4.

Figure 6 is a perspective view of one form of lashing at the bottom edge of one of the cases.

Figure 7 is a similar view of another form of lashing for the bottom edge of one of the cases.

Figure 8 is a perspective view of one form of the lashing for a top corner of the crate or casing.

Figure 9 is a plan view of a tensioning device of the apparatus.

Figure 10 is a side view thereof.

Figure 11 is a plan view of another form of tensioning device attached to a pad eye on a vessel.

Figure 12 is a side view thereof.

Figure 13 is a plan view of one of the holding straps.

Figure 14 is a side view of one of the end loops of the strap.

Figure 15 is a plan view of a short yoke link.

Figure 16 is a side view thereof.

Figure 17 is a side view of a pair of connecting links.

Figure 18 is a plan view of one of the links.

In the drawings similar numerals refer to similar parts throughout the several views.

Figure 20:
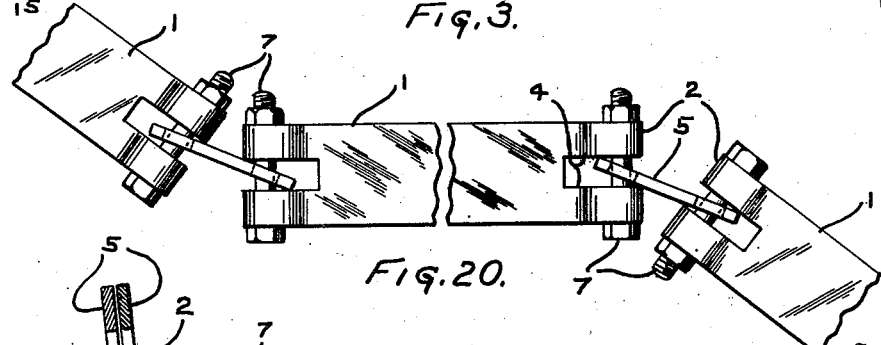
Figure 20 is a view of a plurality of straps in offset position.
Figure 19:
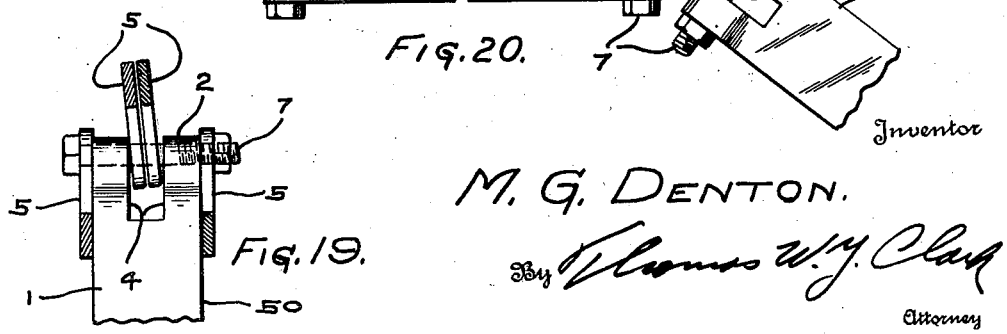
Figure 19 is a view of the connection of the holding straps to the bottom straps in Figure 3, on line 19—19.

One of the elements of the lashing apparatus of this invention comprise straps or strips 1, of metal, mild steel being preferred, of relatively great width, in the practice of the invention they have been four inches wide and $\frac{3}{16}$" thick. The ends 2 are bent, in line with the width, into a loop as shown in Figure 14 and the extreme ends are welded as at 3 to the face of the strap. The ends have deep slots 4 cut back in their centers beyond the loop as shown in Figures 13 and 14. The loops are preferably of substantially teardrop formation to withstand the greatest tension without further extension. These straps are made up into a plurality of standard lengths. They are connected together by means of links 5 shown in Figure 17 having holes 6 drilled therein through which connecting bolts 7 pass. The links may be on the outside of the strap as shown generally at 8 in Figure 1 or they may be inside of the strap, in the slot 4, as shown in Figure 20. Or links may be connected to the strap both in the slots and on the outside where it is desired to attach three straps to a common bolt as shown in Figure 19.

Tensioning means to fasten the strap to the pad eyes on the vessel deck shown in Figures 11 and 12 consist of short yoke members 9 having aligned holes 10 passing through the ends thereof and an additional hole 11 in the center thereof. Bolts 7 pass through the holes 10 in the yoke member and through the loops 2 in the strap. The pad eye 12 fast to a vessel deck 13 have attached to them clevices 14 to which the tensioning means is affixed. This means further consists of a long yoke member 15 constructed generally like the short yoke member 9 and through the center openings 16 in the long member 15, and 11 in member 9, is passed a bolt 17.

This bolt with its head 18 rotates freely in holes 11 and 16. A nut 19 is welded to the center of the member 15 and a further nut 20 is welded to the bolt 17. Turning nut 20 in the proper direction draws yoke members 9 and 15 together. When the member 15 is attached to the pad eye on the vessel deck and the member 9 attached to the strap which passes over the cargo to be lashed, taking up on the tensioning device will tighten the strap and hold the cargo securely to the vessel deck.

Where the tensioning means is used to connect two straps a slight modification of structure is preferable and this is shown in Figures 9 and 10. Here identical yoke members 21 and 22 for attachment to strap ends are shown, with a bolt 23, threaded at one end right hand and at the other end left hand and with each bolt end passing through nuts 24 and 25 welded to the center of members 21 and 22 respectively, and with the bolt having center nut 26 welded thereto, so that turning the center nut in the proper direction draws up on the tensioning device at both ends.

The lashing apparatus also comprises corner irons 27. These irons are yoke shaped members having holes through the center 28 and with L-shaped sides 29, the bottom of the L being welded to the other portion as at 30. The bottom has two holes 31 and 32 in each side for the passage of holding bolts therethrough. The center of the corner iron has welded to it a nut 33 through which bolt 34 may be turned by nut 35 welded thereto to draw up on the small yoke member 36 to tension a strap attached thereto.

Small yoke members 37 with holes through the ends are likewise a part of the apparatus to furnish small lengths where required as shown in Figure 7, or to allow two straps to be attached together and pull off lengthwise from one another twisted at right angles to one another.

Figure 1:
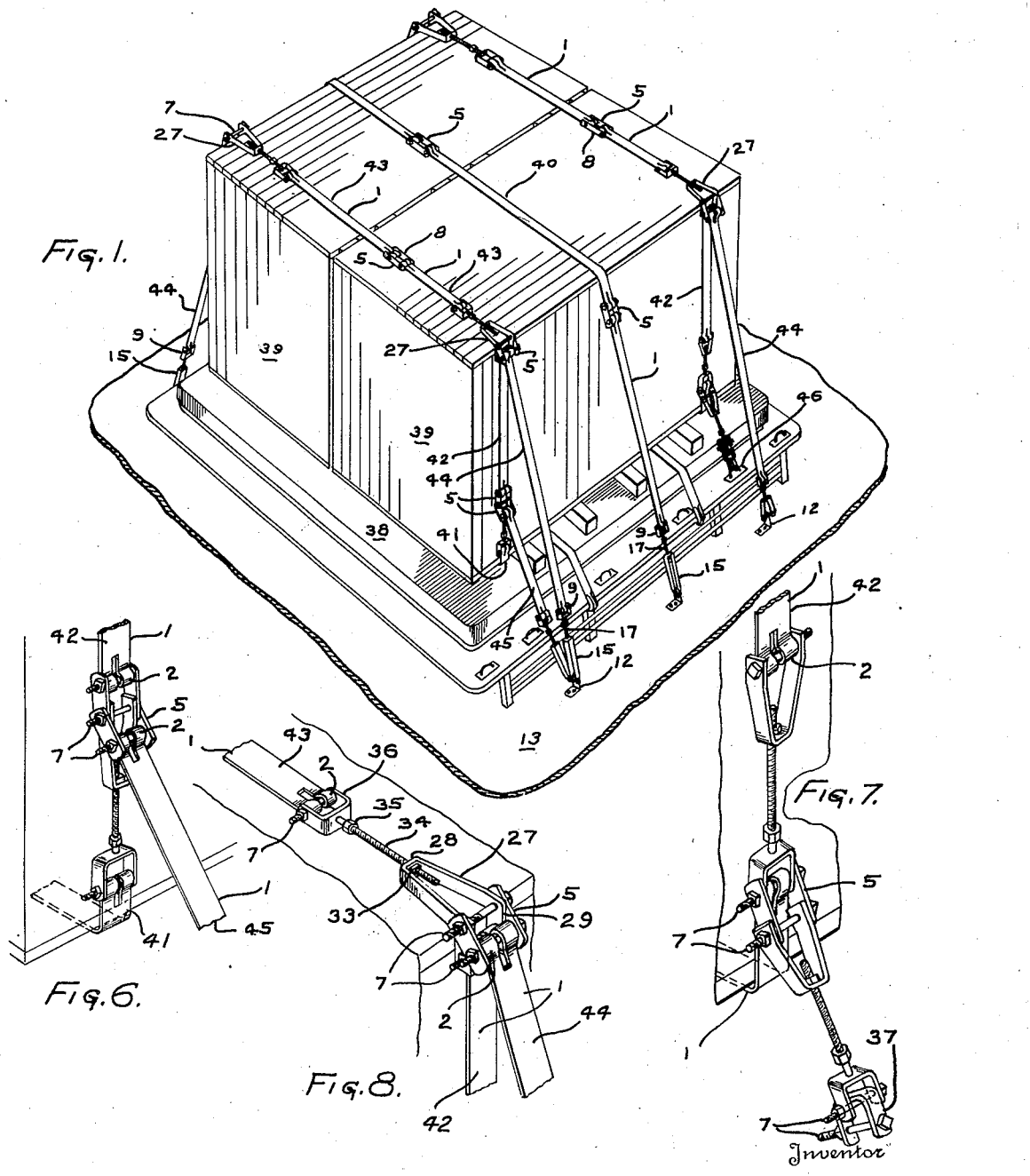
Figure 1 is a perspective view of the lashing apparatus and method of this invention showing two large and heavy packing cases lashed to the hatch of a vessel.

The lashing apparatus above described may be used to carry out the method of the present invention. Heavy timbers are placed on the hatch cover 38 over the hold in the deck 13 of a vessel. Large packing cases 39 are then placed on these timbers and lashing apparatus with tensioning means 40 is thrown over the packing cases transversely of the vessel deck. Bottom straps 41 are placed beneath the cases. Side straps 42 are attached to the bottom straps with a tensioning device therebetween. The side straps 42 are attached to a corner iron 27 and top straps 43 connect the corner irons together on the respective sides of the cases. The corner irons are then connected by means of a strap 44 to the pad eye 12 on the vessel deck with a tensioning device therebetween. Additional side straps 45 may connect the lower ends of the side straps 42 to the same pad eye 12, as shown in Figures 1 and 6. Or the lower end of the side straps 42 may be attached to other pad eyes 46 on the side of the hatch, as shown in Figure 7.

Figure 8 shows a detail of the corner iron and the manner of attaching the three straps thereto.

Figure 2:
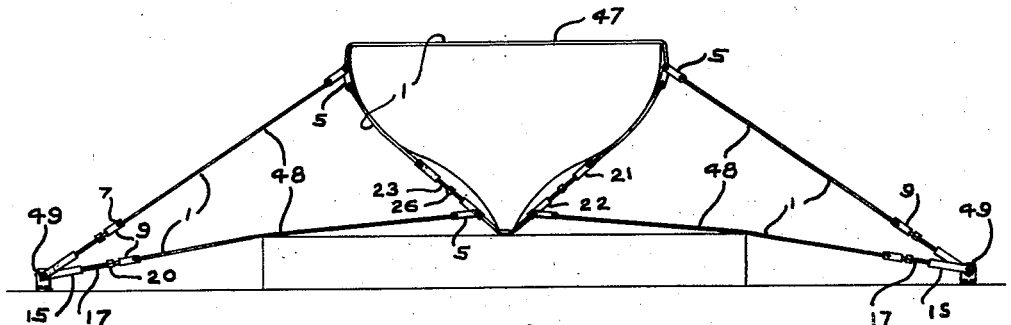
Figure 2 is a rear view of a boat similarly lashed.

Figure 2 shows a detail of the manner of lashing a vessel to the top of a larger vessel. Lashing apparatus 47 surrounding the smaller boat consists of a long strap over the top of the boat, a short strap under the bottom and short straps at the sides with tensioning devices connecting them with the bottom strap. Holding straps 48 are taken off at the ends of the top strap, and the ends of the bottom strap and they are connected to a common pad eye on the opposite sides of the deck of the larger vessel. Tensioning devices are between these holding straps 48 and the pad eyes 49.

Figure 3:
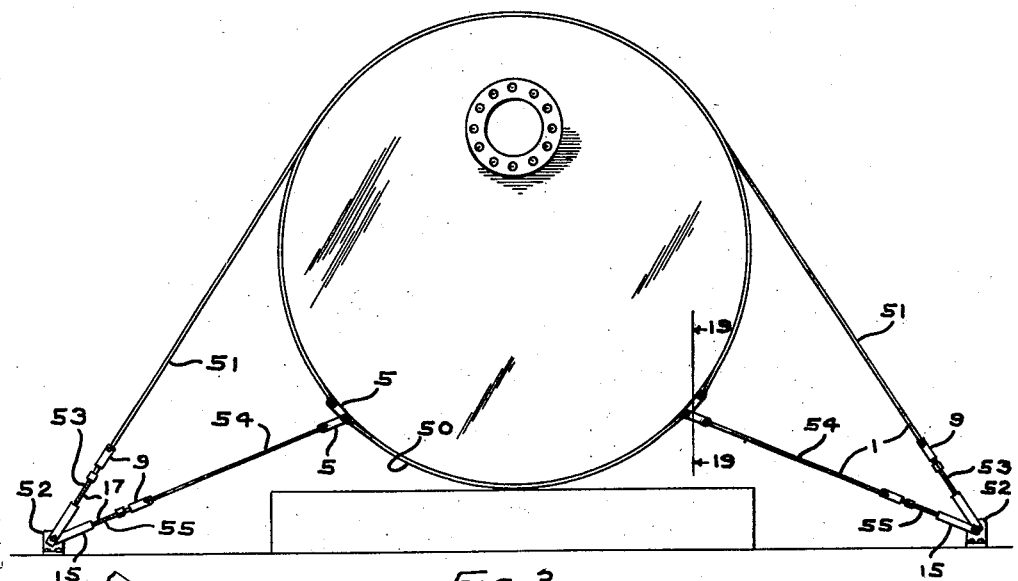
Figure 3 is an end view of a tank similarly lashed.

Figure 3 shows the method of the use of the lashing apparatus of this invention to securely hold a round object such as the boiler of a locomotive or a large tank upon the deck of a vessel. In this method a bottom strap 50 is passed under the tank. Long holding straps 51 are attached to the ends of this bottom strap and pass around and over the top of the tank, passing each other and they are brought down to pad eyes 52 of the deck of the vessel and a tensioning device 53 is interposed between the ends of the straps 51 and the eyes 52. Additional holding straps 54 with tensioning devices 55 are connected at one end to the eyes 52 and at the other ends to the bottom strap. Links 5 for connection from the bottom strap 50 to straps 54 are in its slot 4, and for the strap 51, on its outer edges as shown in Figure 19, to allow the two straps 51 to lie side by side, the center links pull slightly sidewise. This same form of apparatus is used to connect the holding straps from the top strap in Figure 2. It will be apparent that drawing up on the tensioning means 53 and 55 in Figure 3 will securely hold the tank in rigid position.

Additional versatility in the use of the lashing apparatus is illustrated in Figure 20. At times it is desirable to attach a packing case to the vessel deck where the pad eyes are not directly, transversely of the vessel, opposite one another. In such a case it might be desirable to run one strap from one pad-eye directly to the top of the case, connecting to an angle iron and then the other opposed angle might be moved forward of the vessel several inches to connect with a forward pad-eye and in that event the strap going across the top of the case would have to be offset so as to connect it to the two opposed corner irons. Such an offset would be possible with the arrangement shown in Figure 20.

It will be apparent from the above description that the lashing method and apparatus of this invention has great versatility in its application to loading of cargo upon vessel decks. The straps may be pieced together as at 8 if the exact desired lengths are not at hand. The straps are so wide that they will not cut into packing cases when forcefully bent over their corners by means of the tensioning device. The straps are so stiff as to be readily handled and pushed around from one end. They are so flexible as to conform to the shape of the article being lashed by only the force applied through the tensioning device. The tensioning devices all have the turnbuckle nuts of the same size so that one wrench can do the complete job.

Few employees are required and they can lash the cargo in a small proportion of the time heretofore required by the use of chains and wire cables. Likewise when a heavy sea crashes over the top of a vessel and tends to lift the cargo from the deck the lashing attached to the cargo near the deck holds it firm. Likewise, when the seas strike the top of the cargo, the lashing attached at the top holds it firm. In the event of unusually heavy seas being shipped and the yoke members substantially straightening out at their angles, drawing up on the tensioning devices at the end of each strap attaching to the deck will restore the firm tension of the straps on the cargo by means of the use of a simple wrench and this service can be performed in a very short time and even in heavy seas.

It will be apparent that many modifications and variations in the detail of the apparatus and in the method of its use may be made without departing from the invention.

What is claimed as new and is desired to be secured by Letters Patent is:

1. A cargo lashing apparatus comprising a lashing strap having welded loops formed at the ends of teardrop shape by bending the strap along the width thereof to attach to the cargo, a pair of clips having registering holes in the ends thereof, means to hold one of said clips to one end of said strap, said means passing through the loop and the holes of the clip, the other clip being adapted to be attached to the cargo support, and turnbuckle tensioning means attaching said clips together.

2. A cargo lashing apparatus comprising a relatively wide lashing strap to attach to the cargo and having loops formed at the ends thereof by bending the strap ends along the width thereof and welding the end face of the strap to the strap face and turnbuckle tensioning means connectible to said strap, to the loop thereof, said tensioning means being adapted to be attached also to the cargo support.

MALCOLM G. DENTON.